United States Patent
Kaler et al.

(10) Patent No.: US 7,694,131 B2
(45) Date of Patent: Apr. 6, 2010

(54) USING RICH POINTERS TO REFERENCE TOKENS

(75) Inventors: Christopher G. Kaler, Sammamish, WA (US); Arun K. Nanda, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 11/537,019

(22) Filed: Sep. 29, 2006

(65) Prior Publication Data

US 2008/0082638 A1 Apr. 3, 2008

(51) Int. Cl.
*H04L 29/06* (2006.01)
*G06F 21/00* (2006.01)

(52) U.S. Cl. .................. 713/159; 713/150; 713/155; 713/185

(58) Field of Classification Search ......... 713/182–186, 713/150, 155, 159
See application file for complete search history.

(56) References Cited

U.S. PATENT DOCUMENTS

| | | | |
|---|---|---|---|
| 5,706,349 | A | 1/1998 | Aditham et al. |
| 6,898,711 | B1 | 5/2005 | Bauman et al. |
| 7,356,690 | B2 * | 4/2008 | Benantar .................. 713/155 |
| 2003/0163513 | A1 | 8/2003 | Schaeck et al. |
| 2004/0103339 | A1 | 5/2004 | Chalasani et al. |
| 2004/0139319 | A1 | 7/2004 | Favazza et al. |
| 2005/0021494 | A1 * | 1/2005 | Wilkinson .................. 707/1 |
| 2005/0097060 | A1 | 5/2005 | Lee et al. |
| 2005/0114701 | A1 | 5/2005 | Atkins et al. |
| 2005/0131583 | A1 | 6/2005 | Ransom |
| 2005/0138381 | A1 | 6/2005 | Stickle et al. |
| 2005/0154913 | A1 | 7/2005 | Barriga et al. |
| 2005/0223412 | A1 | 10/2005 | Nadalin et al. |
| 2005/0278365 | A1 * | 12/2005 | Boucousis .................. 707/100 |
| 2006/0112422 | A1 * | 5/2006 | Tevosyan et al. ............... 726/9 |
| 2006/0206932 | A1 * | 9/2006 | Chong ......................... 726/10 |
| 2006/0230270 | A1 * | 10/2006 | Goffin ........................ 713/173 |

OTHER PUBLICATIONS

J. Franks et al. An Extension to HTTP: Digest Access Authentication, Jan. 1997, RFC 2069 published by IETF.*
Bharagavan, Karthikeyan, et al., "Secure Session for Web Services", (http://research.microsoft.com/projects/samoa/), Aug. 23, 2004.
"Web Services Security X.209 Certificate Token Profile (OASIS Standard 200401)", Mar. 15, 2004.
Baja, Siddharth, et al., "Web Services Federation Language (WS-Federation)", 2003, pp. 1-41, http://xml.coverpages.org/WS-Federation.pdf#search=%22web%20service%20federation%20(WS-federation)%2Bpdf%22 (PDF Attachment Article 1).

(Continued)

*Primary Examiner*—Nathan Flynn
*Assistant Examiner*—Jeong S Park
(74) *Attorney, Agent, or Firm*—Workman Nydegger

(57) ABSTRACT

Providing reference tokens. A method includes receiving a request for a token. In response to the request for a token and in place of a token, one or more rich pointers are sent referencing one or more tokens. The rich pointers point to locations where one or more actual tokens can be retrieved. When only a single pointer is sent, the pointer is a reference other than an HTTP URL.

20 Claims, 2 Drawing Sheets

OTHER PUBLICATIONS

"Security in a Web Services World: A Proposed Architecture and Roadmap", A joint whitepaper from IBM Corporation and Microsoft Corporation, 2002, Version 1.0, pp. 1-25, http://www.verisign.com/wss/architectureRoadmap.pdf#search=%22web%20services%20federation%20(WS-federation)%2Bpdf%22 (PDF Attachment Article 2).

Leavitt, Neal, "Are Web Services Finally Ready to Deliver?", Technology News, Nov. 2004, pp. 14-18, http://csdl2.computer.org/comp/mags/co/2004/11/ry014.pdf (PDF Attachment Article 3).

* cited by examiner

USING RICH POINTERS TO REFERENCE TOKENS

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Modern computers often include functionality for connecting to other computers. For example, a modern home computer may include a modem for dial-up connection to internet service provider servers, email servers, directly to other computers, etc. In addition, nearly all home computers come equipped with a network interface port such as an RJ-45 Ethernet port complying with IEE 802.3 standards. This network port, as well as other connections such as various wireless and hardwired connections can be used to interconnect computers.

Often, when communicating with one another, computer systems require an authentication process to take place to verify identities and ensure that a computer system has appropriate rights to services being requested. One method of performing this authentication process includes requests for and issuance of security tokens. Security tokens can be presented by a computer system, to a service which has functionality that the computer system desires to access. The security token can be used to verify the identity of the computer system.

Illustrating now an exemplary case, a client system may have use for accessing functionality at a service. However, before accessing the service, the client may request a token from a token provider service. The token provider service acts as a third party that is trusted by both the client system and the service which the client wants to access. Generally, a token includes personally identifying information for the client in the token that is returned to the client. The token also includes other information, such as a certificate, that indicates that the token was issued by the token provider service. The token can then be presented by the client to the service that the client desires to access. Because the service trusts the token provider service, the token will be accepted and the services provided to the client.

Generally, tokens may include a significant amount of information with respect to the size of the channel in which the tokens are transmitted. This can result in relatively slow transmission of the token. This can be further compounded the more remote the token provider is from the client.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment, which may be practiced in a network computing environment, includes a method of providing tokens. The method includes receiving a request for a token. In response to the request for a token and in place of a token, one or more rich pointers are sent referencing one or more tokens. The rich pointers point to locations where one or more actual tokens can be retrieved. When only a single pointer is sent, the pointer is a reference other than an HTTP URL.

In another embodiment, a method of obtaining tokens is illustrated. The method includes sending a request for a token. In response to the request for a token, one or more rich pointers are received referencing one or more tokens. The rich pointers point to locations where one or more actual tokens can be retrieved. When only a single pointer is sent, the pointer is a reference other than an HTTP URL.

In another embodiment, a method of utilizing tokens is illustrated. The method includes accessing one or more rich pointers referencing one or more tokens. The rich pointers point to locations where one or more actual tokens can be retrieved. When only a single pointer is used, the pointer is a reference other than an HTTP URL. The one or more rich pointers referencing one or more tokens are used as tokens.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

Often, tokens may be large with respect to the channels used for transmitting them. To alleviate the slow-downs due to narrow channel widths, some embodiments described herein include functionality for sending pointers to the tokens in place of actual tokens. For example, a client may request a token from a token provider. The token provider issues, in place of a token, one or more pointers to locations where tokens can be obtained. The one or more pointers to locations where tokens can be obtained may be packaged such that they appear to the client to be a token returned in response to the request for a token. The pointers may be consumed by an internal application to obtain the actual tokens.

Figure 1:
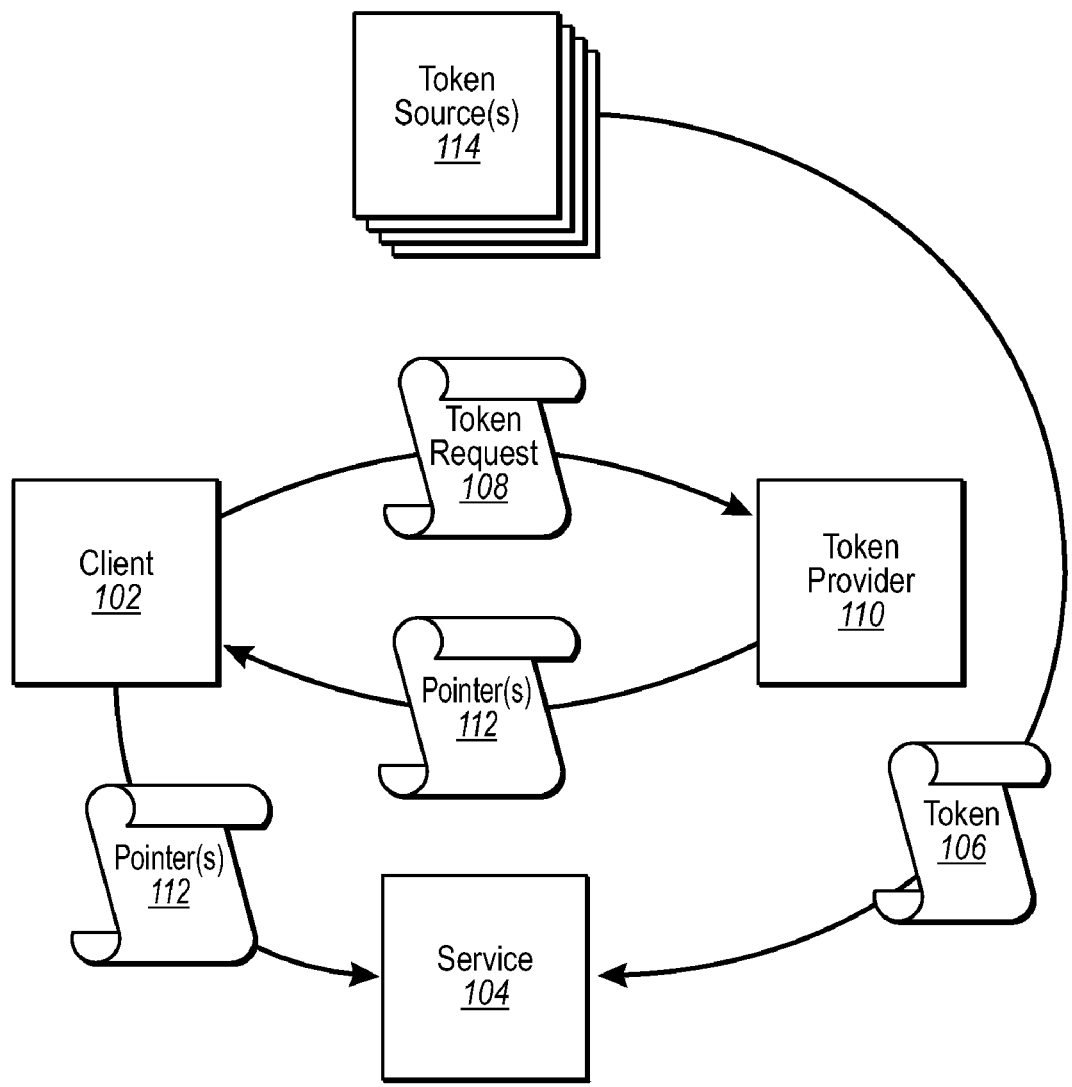
FIG. 1 illustrates one environment where reference tokens can be used.

Referring now to FIG. 1, an exemplary embodiment is illustrated. FIG. 1 illustrates a client 102 and a service 104. The service 104 may have functionality which the client 102 desires to access. To access the functionality of the service 104, the client ordinarily presents a token to the service 104.

However, in one embodiment, the client 102 may present a pointer 112 in place of a token 106 to the service 104, such that the service 104 can obtain the token 106 from a token source 114. Illustratively, the client 102 sends a token request 108 to a token provider 110. The token provider 110 sends, in place of the token, one or more pointer(s) 112 to locations of token sources 114 where tokens 106 can be obtained. The client 102 can then send the pointers 112 to the service 104. The service 104 can then retrieve tokens 106 from the token sources 114.

In an alternative embodiment, the client 102 can present the token 106 directly to the service 104. To obtain the token 106, the client 102 sends a token request 108 to a token provider 110. The token provider 110 sends, in place of the token, one or more pointer(s) 112 to locations of token sources 114 where tokens 106 can be obtained. The client 102 can then retrieve tokens 106 from the token sources 114 to present to the service 104.

Notably, the pointers 112 can point to any one of a number of different locations. For example, the pointers may point to Uniform Resource Locators (URLs), Uniform Resource Identifiers (URIs), telephone numbers, fax numbers, physical mailing addresses, etc. In one embodiment, the pointer may reference an endpoint reference which includes both a URI and metadata.

Several optimizations can be obtained using various alternative embodiments of the system shown in FIG. 1. For example, in one embodiment, the token sources may be geographically distributed. Several of the token sources, each at different geographic locations, may have copies of the same tokens. Thus, the pointers 112 may include information that indicates that a single token may be obtained from a number of different locations and information about the locations. As such, the client 102 may select the closest token source 114 to obtain a token 106 to minimize network traffic.

In a similar embodiment, other rankings or metadata about token sources 114 may be included with the pointers 112. For example, metadata may specify one or more of the types of networks that need to be used to access the token sources, the types of security needed to access token sources, the relative load from other activities on token sources, etc. The client 102 can then select a token source based one or more factors to determine an optimal token source 114 for obtaining a token 106.

Notably, the environment illustrated in FIG. 1 may be applied to a number of different environments. For example, the functionality illustrated may be applied to browser environments. Alternatively, the functionality illustrated may be applied in non-browser environments.

Figure 2:
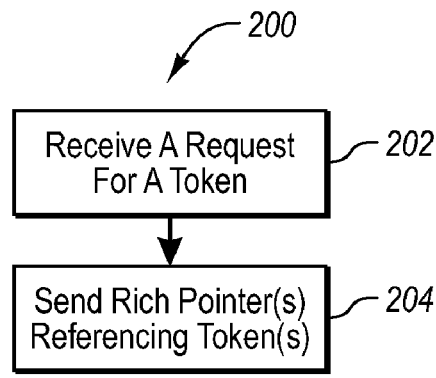
FIG. 2 illustrates a method of sending references to tokens.

Referring now to FIG. 2, a method 200 of providing tokens is illustrated. The method may be practiced, for example, in a network computing environment. In the example illustrated in FIG. 1, the method may be practiced, for example, from the perspective of the token provider 110. The method includes receiving a request for a token (act 202). As illustrated in FIG. 1, a token provider 110 may receive a request from a client 102.

The method 200 further includes sending one or more rich pointers referencing one or more tokens (act 204) in response to the request for a token and in place of a token. The rich pointers point to locations where one or more actual tokens can be retrieved. For example, token sources 114 may store tokens that can be referenced by the pointers 112. The tokens 106 can then be retrieved from the token sources 114. In one embodiment, when only a single pointer is sent, the pointer is a reference other than an HTTP URL.

Various other references can be used for the pointers. For example, in one embodiment, at least one of the pointers is an endpoint reference including a URI and metadata.

Notably, as discussed above, different pointers can point to different locations for obtaining the same token. In one embodiment information is included with the pointers specifying a geographical location where the tokens can be obtained. This allows a client to token source based on location.

Embodiments may further include sending metadata about the locations where one or more actual tokens can be retrieved. For example, in one embodiment as illustrated above, information may be sent regarding network connections to connect to the token source, functionality of the token source and the like.

One embodiment further includes sending keyed information for verifying one or more tokens. For example, in the Example of FIG. 1, the token provider 110 may provide a key, such as a cryptographic key, with the pointers 112. Thus keyed information is sent. The keyed information may be used to verify the authenticity of a token 106 obtained from a token source 114.

Other embodiments may also be implemented for providing security for tokens. For example, the method 200 may include sending digests for verifying one or more tokens. In another embodiment, the method 200 may include sending identity information for verifying one or more tokens.

In one embodiment of the method 200, receiving and sending are performed using Web Services. Specifically, Web Services may be used to implement the messaging for token requests and token issuance. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated. In particular, in one embodiment, WS-Trust, an authentication protocol used in Web Services applications, may be used with the extended functionality of being able to have alternate personally identifying information specified by a client for inclusion in a security token.

Figure 3:
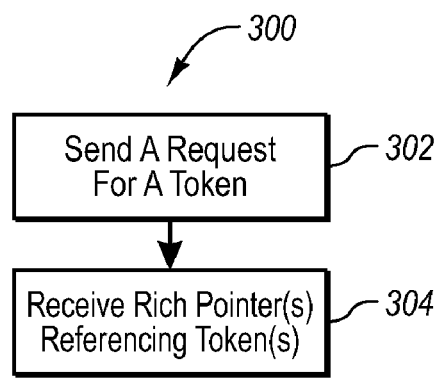
FIG. 3 illustrates a method of receiving references to tokens.

Referring now to FIG. 3, a method from the perspective of a client is illustrated. The method 300 may be practiced, for example, in a network computing environment. The method includes various acts for obtaining tokens. The method includes sending a request for a token (act 302). For example, as illustrated in FIG. 1, a client 102 can request a token from a token provider 110.

In response to the request for a token, the method 300 includes receiving one or more rich pointers referencing one or more tokens (act 304). The rich pointers point to locations where one or more actual tokens can be retrieved. For example in the example shown in FIG. 1, the rich pointers may point to the token sources 114. When only a single pointer is sent, the pointer is a reference other than an HTTP URL.

In one embodiment, the method 300 further includes obtaining one or more tokens from one or more of the locations pointed to in the one or more rich pointers. For example, as illustrated in FIG. 1, the client 102 can obtain the token 106 from a tokens source 114. In an alternative embodiment, the client 102 does not obtain the tokens 106; but rather presents the pointers 112 to services 104 such that the services 104 can obtain the tokens themselves.

Notably, embodiments may be implemented where the rich pointer references can themselves be used as token. For example, in one embodiment, the method 300 further includes using the one or more rich pointers referencing one or more tokens as tokens. The rich pointers may have associated proof with the pointers that allows the pointers with the associated proof to be used as tokens. Illustratively, in one embodiment, the client 102 may use the associated proof to locally generate a token which may be used to access the functionality of the service 104. Alternatively, the client 102 may simply present the pointer 112 as a token where the associated proof provides token security.

Figure 4:
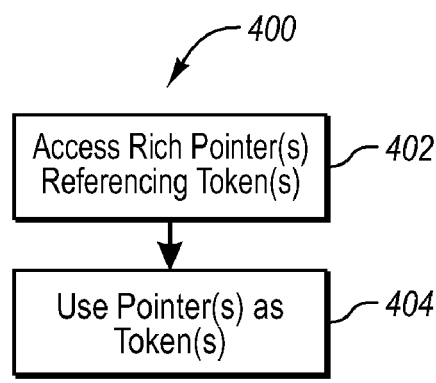
FIG. 4 illustrates a method of using pointers to access tokens.

Another method similar to this embodiment is illustrated in FIG. 4. In the method 400 illustrated in FIG. 4, an act of accessing one or more rich pointers referencing one or more tokens act (402) is illustrated. Thus, in this example, the pointer references are not necessarily obtained from a token provider or other external source, but can be obtained from local sources. As in other embodiments, the rich pointers point to locations where one or more actual tokens can be retrieved. When only a single pointer is used, the pointer is a reference other than an HTTP URL. The method 400 further includes an act of using the one or more rich pointers referencing one or more tokens as tokens (act 404). As illustrated above, if the pointers include their own associated proof, such as cryptographic proof or other proof, the pointers themselves can be used as tokens.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network computing environment, a method of providing security tokens, the method comprising a computing system performing the following:
   receiving a request for a security token;
   packaging one or more rich pointers referencing one or more security tokens and pointing to locations where one or more actual security tokens can be retrieved such that the one or more rich pointers appear to a client to be one or more security tokens, but whereafter the pointers are consumed by another application to obtain the actual security tokens;
   in response to the request for a security token and in place of a security token, sending one or more rich pointers referencing one or more security tokens, the rich pointers pointing to locations where one or more actual security tokens can be retrieved, and wherein when only a single pointer is sent, the pointer is a reference other than an HTTP URL;
   whereafter, the pointer is presented to a service by the client as a security token to access functionality of the service, without the client actually presenting the security token pointed to in the pointer; and
   whereafter the service obtains the security token from a security token provider pointed to in the pointer allowing the client to access the functionality of the service without the client obtaining or presenting the actual security token pointed to in the pointer.

2. The method of claim 1, wherein at least one of the pointers is an endpoint reference comprising a URI and metadata.

3. The method of claim 1, wherein different pointers point to different locations for obtaining the same security token.

4. The method of claim 3, wherein security token sources are geographically distributed including several security token sources, each at different geographic locations, and each having copies of at least one same security token, wherein information is included with the pointers specifying the different geographical locations where the security tokens can be obtained.

5. The method of claim 1, further comprising sending metadata about the locations where one or more actual security tokens can be retrieved.

6. The method of claim 1, further comprising sending keyed information for verifying one or more security tokens.

7. The method of claim 1, further comprising sending digests for verifying one or more security tokens.

8. The method of claim 1, further comprising sending identity information for verifying one or more security tokens.

9. The method of claim 1, wherein the method is performed using Web Services messages.

10. In a network computing environment, a method of obtaining security tokens, the method comprising, at a client computing system, the client computing system performing the following:
    sending a request for a security token;
    in response to the request for a security token, receiving one or more rich pointers referencing one or more security tokens, the rich pointers pointing to locations where one or more actual security tokens can be retrieved, and wherein when only a single pointer is sent, the pointer is a reference other than an HTTP URL, wherein the one or more rich pointers are packaged to appear to a client to be one or more security tokens;

the client presenting the pointer to a service as a security token to access functionality of the service, without the client actually presenting the security token pointed to in the pointer; and whereafter the service obtains the security token from a security token provider pointed to in the pointer allowing the client to access the functionality of the service without the client obtaining or presenting the actual security token pointed to in the pointer.

11. The method of claim 10, further comprising obtaining one or more security tokens from one or more of the locations pointed to in the one or more rich pointers.

12. The method of claim 10, further comprising using the one or more rich pointers referencing one or more security tokens as security tokens by using proof associated with the pointers that allows the pointers with the proof to be used as security tokens.

13. In a network computing environment, a method of utilizing security tokens, the method comprising, at a client computing system, the client computing system performing the following:

accessing one or more rich pointers referencing one or more security tokens, the rich pointers pointing to locations where one or more actual security tokens can be retrieved, and wherein when only a single pointer is used, the pointer is a reference other than an HTTP URL, wherein the one or more rich pointers are packaged to appear to a client to be one or more security tokens;

using the one or more rich pointers referencing one or more security tokens as security tokens by using proof associated with the pointers that allows the pointers with the proof to be used as security tokens;

whereafter, the pointer is presented to a service by the client as a security token to access functionality of the service, without the client actually presenting the security token pointed to in the pointer; and whereafter the service obtains the security token from a security token provider pointed to in the pointer allowing the client to access the functionality of the service without the client obtaining or presenting the actual security token pointed to in the pointer.

14. The method of claim 13, wherein at least one of the pointers is an endpoint reference comprising a URI and metadata.

15. The method of claim 13, wherein different pointers point to different locations for obtaining the same security token.

16. The method of claim 15, wherein the different locations are in different geographic locations, and wherein information is included with the pointers specifying the different geographical locations where a same token can be obtained.

17. The method of claim 13, further comprising sending metadata about the locations where one or more actual security tokens can be retrieved.

18. The method of claim 13, further comprising sending keyed information for verifying one or more security tokens.

19. The method of claim 13, further comprising sending digests for verifying one or more security tokens.

20. The method of claim 13, further comprising sending identity information for verifying one or more security tokens.

* * * * *